United States Patent [19]

Manguso

[11] 3,919,803
[45] Nov. 18, 1975

[54] BUOYANT FISH BASKET
[75] Inventor: Jerry R. Manguso, Scottsdale, Ariz.
[73] Assignee: Gene Weber, Scottsdale, Ariz. ; a part interest
[22] Filed: Sept. 19, 1974
[21] Appl. No.: 507,576

[52] U.S. Cl. ................................................. 43/55
[51] Int. Cl.² ........................................ A01K 97/04
[58] Field of Search ................................. 43/55, 56

[56] References Cited
UNITED STATES PATENTS

| | | |
|---|---|---|
| 2,030,793 | 2/1936 | Horn .................................... 43/55 |
| 2,241,314 | 5/1941 | Mohler ................................. 43/55 |
| 3,381,408 | 5/1968 | Nishimura ............................ 43/55 |
| 3,478,463 | 11/1969 | Ruter .................................... 43/55 |

Primary Examiner—Warner H. Camp
Attorney, Agent, or Firm—Gregory J. Nelson

[57] ABSTRACT

A floating fish basket has a buoyant ring or collar, a net is secured about the ring and forms a holding area for the fish, a tether line has one end looped about the ring, and a buoyant pivoted cover is attached through the rope loop to the collar.

1 Claim, 6 Drawing Figures

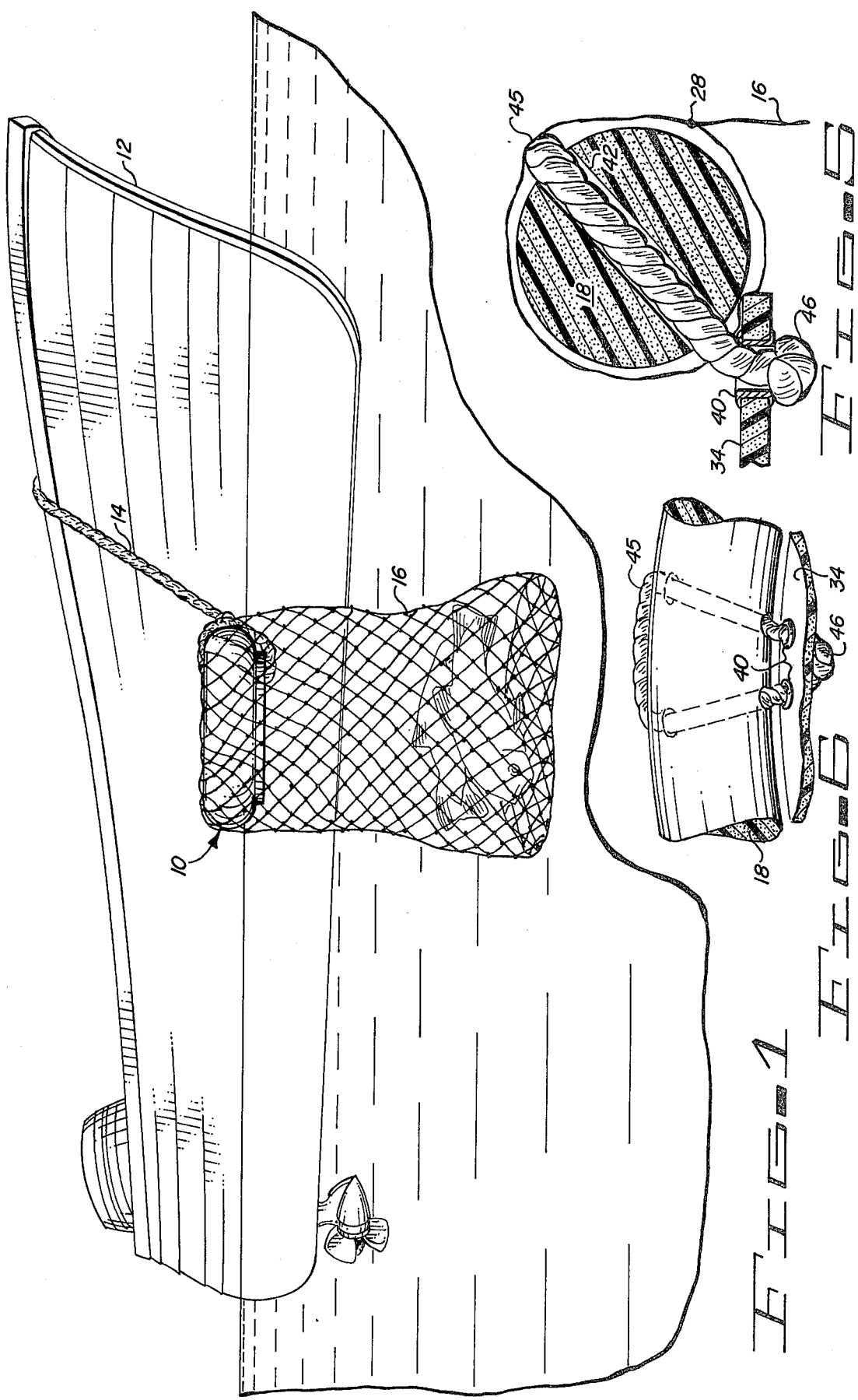

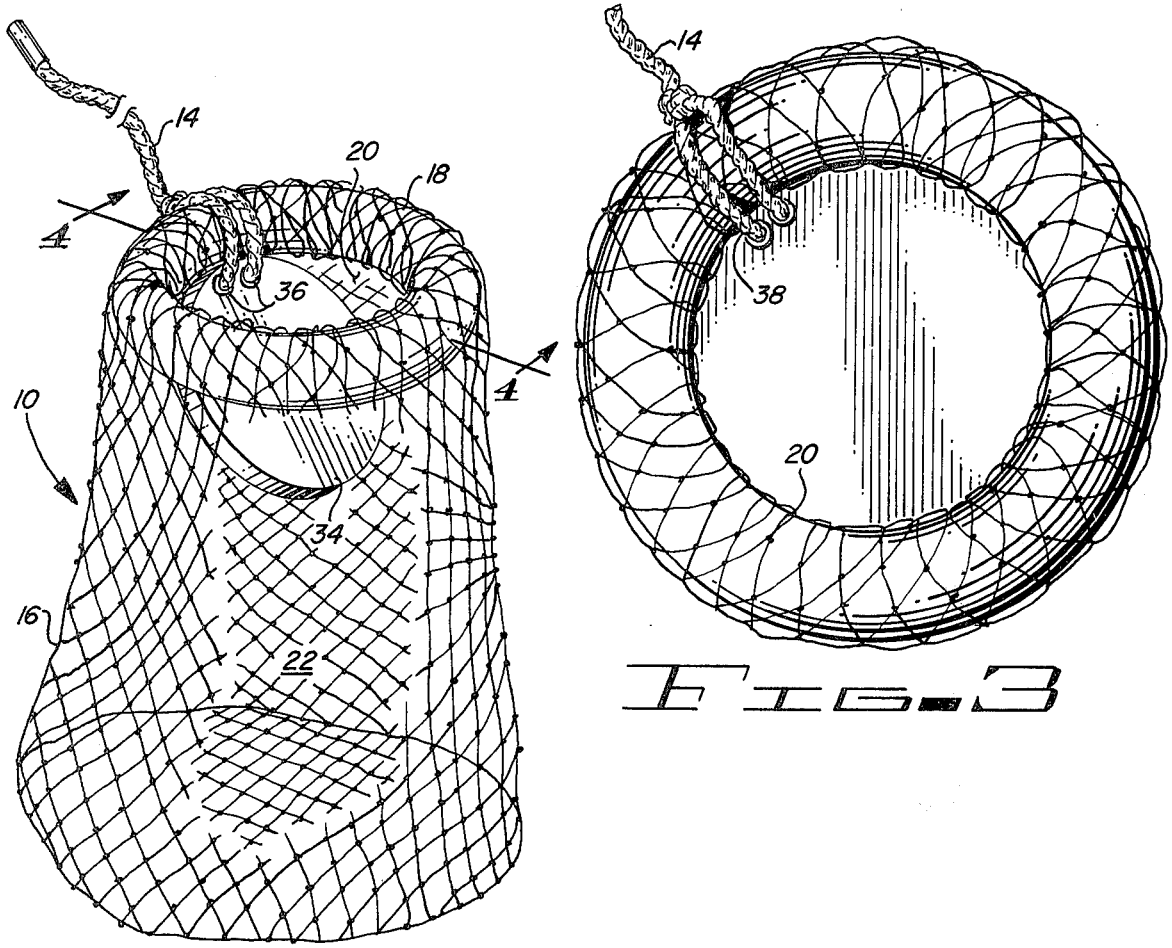
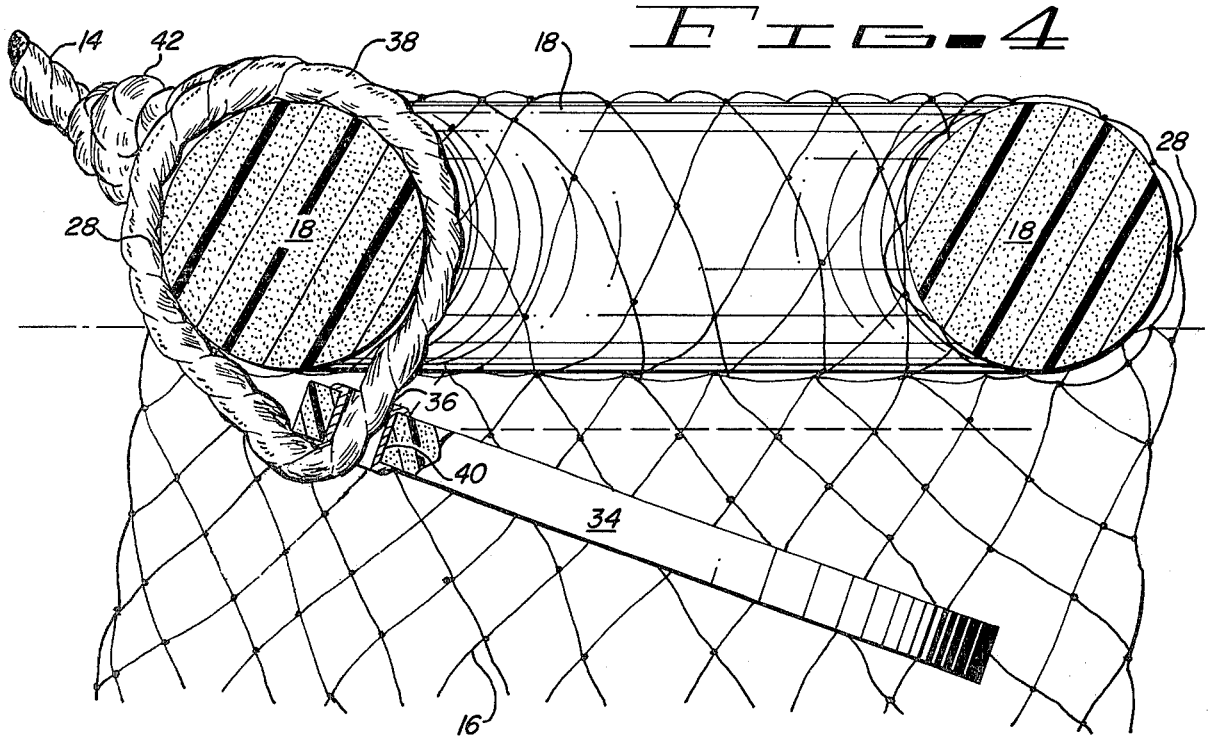

BUOYANT FISH BASKET

This invention relates to fishing equipment and more particularly it relates to a buoyant basket for receiving and holding fish after they have been caught to retain them in a live and fresh condition.

After fish have been caught, it is generally recognized that they should be maintained alive until they are cleaned to preserve the meat in as fresh a condition as possible. To accomplish this, most fisherman hold the fish captive in their environmental water in some type of container or in some type of device. It is common, for example, for a fisherman to engage the caught fish on a stringer by securing a loop or hook through the fish's mouth and gill. The stringer device is then secured to the gunwale of the boat and the captive fish are maintained in their environmental water. It is inconvenient and somtimes difficult to engage a fish in a stringer and often injury to the fish results causing the fish to die.

Other devices are known for maintaining the caught fish in a live condition. It is known, for example, to simply contain the fish in an immersible, flexible bag of wire or cloth mesh which is closeable by a drawstring. Such containers are generally not satisfactory in that they are not buoyant and present difficulty to the fisherman when the fisherman is attempting to place the fish within the container.

In an attempt to overcome these difficulties, several buoyant or flotable fish baskets having improved cover assemblies are disclosed in the prior art. For example, the patent to Ruter, U.S. Pat. No. 3,478,463 discloses a collapsible wire fish basket having a funnel shaped inlet ring which is fastened to an annular flotation collar. However, the structure disclosed in the patent requires the use of complicated fastener device to secure the basket portion to the flotation collar. Similarly, the patent to Nishimura, U.S. Pat. No. 3,381,408, discloses a fish basket with a floating door also requiring a complicated door hinge assembly for securing the door to the basket.

All of the above mentioned prior art devices have a common drawback in that they are expensive to manufacture having closure hinge devices of complex design. The hinge devices also present the fisherman with difficulties when it is necessary to insert or remove fish from the container.

In an effort to overcome the drawbacks of prior art devices, the present invention provides a floating fish basket which is relatively simple and yet highly adapted for its intended purpose. The basket of the present invention may be utilized in either a fresh or salt water environment with no deleterious effects. The basket of the present invention is highly buoyant and is provided with a cover which is easily opened inwardly to permit fish to be placed within the associated container. The top cover is also of a buoyant material so that its natural buoyancy urges the cover to a closed position to prevent escape of fish.

In accordance with the foregoing, the present invention includes an annular flotation collar of a suitable buoyant material. A cover in the form of a disk is pivotally attached to the collar on its underside so that the disk can be depressed inwardly to accept fish. A mesh net of either natural or synthetic material, is secured to the flotation collar and is wrapped around the collar and secured at a seam. Preferably the cover is pivotally secured to the ring by a tether cord looped about a portion of the collar. The other end of the cord being adapted to secure the basket to a boat or a dock convenient to the fisherman.

Other objects and advantages of the present invention will become apparent from the following specifications, claims and drawings in which:

FIG. 1 is a side elevational view of the fish basket of the present invention attached to the gunwale of a boat in a body of water;

FIG. 2 is a perspective view of the fish basket with the closure depressed to accept insertion of fish;

FIG. 3 is an enlarged plan view of the device shown in FIG. 2;

FIG. 4 is an enlarged partial sectional view taken along lines 4—4 of FIG. 2; and, FIGS. 5 and 6 are detail views further illustrating features of the invention.

Referring now to the drawings, the floating fish basket of the present invention is generally designated by the numeral 10 and is detachably secured to a boat 12 or other structure by appropriate tether line 14. As seen in FIG. 1 the basket 10 of the present invention floats on the surface of a body of water in a convenient position for access by a fisherman. The fish, once they have been caught, are retained in a live condition within the confines of the enclosure or sack as defined by fabric mesh netting 16.

The details of the present invention are better seen in FIGS. 2 through 4. The fish basket of the present invention includes a generally annular ring or collar 18 which serves to define a circular opening 20 through which fish are admitted to the confines of net 16. The collar is formed from a material of sufficient buoyancy to support the weight of the container when submerged in water. The collar can be cork or be in the form of an inflated ring. Cellular expanded polyethylene such as the type sold under the trade name "Ethafoam" or "Styrofoam" have been found to be especially suitable for this purpose having extremely good buoyancy characteristics and being resistant to attack in both salt and fresh water environments. The net 16 is formed as a sack having a closed bottom and an open top end. Net 16 can be fabricated from lightweight mesh of wire or natural or synthetic rope of any convenient cross-sectional configuration which prevents escape of the fish. Preferably the net 16 diverges outwardly from the collar 18 to provide an ample volume within the interior holding area 22 for containing fish.

As best seen in FIGS. 4 and 5, net 16 is secured to collar 18 by wrapping the upper marginal portion of the net about collar 18 so that the terminal edge of net 16 is folded back into continuous contact with a portion of the net at an outer medial location around the collar 18. The edge portion of the net is joined to the net to form annular seam 28. Seam 28 may be formed by appropriate stitching or by interweaving a cord in the mesh of the net. In this way the net 16 is conveniently and securely attached to the collar without the necessity of utilizing any complicated connector devices. Further, this method of joining the net to the collar avoids the use of any metal parts which would be subject to corroison and deterioration.

A closure or cover 34 cooperates with the underside of collar 18 to retain the fish within the holding area 22 defined within the net 16. Closure or cover 34 is conveniently formed of a polyethylene or polystyrene plastic having buoyant characteristics. Preferably cover 34 is in the form of a circular disc having a diameter approximating the median diameter of collar 18 so that in a closed position closure 34 engages the underside of collar 18. A pair of holes 36 are provided adjacent the periphery of closure. A cylindrical grommet 40 of nylon or other suitable materials is inserted in each of the holes 36 to provide a bearing surface so the over repeated use cycles the cover does not become frayed or deteriorate. Closure 34 is pivotally secured to collar 18 by the simple expedient of looping one end of rope 14 about the collar and through each of the cylindrical grommets 40. The inner end of rope 14 is secured in a knot 42. Loop 38 formed by rope 14 is relatively taut so that the tension within the loop 38 will cause the closure 34 to assume a normal position engaging the underside of collar 18 as shown in dotted lines in FIG. 4. When it is desired to gain access to the holding area 22, closure 34 can be manually pushed or swung downwardly as seen in FIG. 4. This manner of hingedly affixing cover 34 to the collar avoids the use of any spring closure member or use of metal parts which are subject to deterioration in a fresh or salt water environment. It should also be noticed that when the container of the present invention is put into water, the closure 34 has buoyant characteristics so that the closure will be normally urged to the closed position preventing the escape of fish.

Tether rope 14 is of sufficient length to allow the basket to be moored or anchored to a boat, dock or other structure convenient to the location of the fisherman.

FIGS. 5 and 6 also illustrate an alternate method of securing cover 34 to float 18. With this method a pair of generally circular passageways 42 are provided diagonally through the collar 18. Preferably passageways 42 are slightly converging from their inner end to their outer ends. A rope hinge is formed by threading rope 45 through grommet 40 and passageway 42 across the surface of collar 18 and back through adjacent passageway 42 and grommet 40. A knot 46 is provided at either end of rope 45 tightly drawing cover 34 against the underside of collar 18.

The fish basket of the present invention will be more readily understood from the following description of use. When the fisherman desires to use the present invention he removes it from a storage location. It should be noted that the design of the basket permits convenient storage in a minimum of space as the flexible net 16 can be folded or collapsed so that the entire unit in storage occupies a space of approximately the size of the flotation collar 18 alone. When the basket is not employed and is in storage, the relatively small size of the collar does not occupy an inconvenient amount of space.

The basket 10 is appropriately secured at a location convenient to the fisherman such as to a boat or dock by securing the free end of rope 14 to an appropriate point of attachment. Basket 10 is then tossed into the water and is held afloat in a visible position on the surface by the flotation collar 18. The flexible net 16 will assume a normal position depending downwardly from the collar as is seen in FIG. 1. Preferably, as pointed out above the enclosure diverges from the periphery of the collar to provide ample space within the holding area 22 for storage of a large catch of fish. Should the basket become detached from the boat or dock it will not sink but will continue to float to permit retrieval.

Cover 34 is held in engagement with the underside of collar 18 by rope loops 38. Natural buoyancy also tends to bias or urge the cover into the closed position. When the fisherman catches a fish that he wishes to keep, the basket can be pulled adjacent the boat or dock. The fisherman simply inserts the fish through the cover 34 causing the cover to swing downwardly. It is not necessary to remove the basket from the water. Once the fish has passed into the holding area, cover 34 returns to its ordinary closed position preventing escape of the contained fish. Should the fisherman accelerate his boat without removing the basket from the water, the basket will simply assume a towed position alongside the boat. The cover 34 will tend to remain in its closed position and the resiliency of the flotation collar will prevent any damage to the boat.

An additional advantage of the present invention is that due to the high degree of flotation of the unit, the basket of the present invention can be utilized as a human life saver in emergency situations.

It will be seen from the foregoing that the present invention provides a novel floating fish basket which is particularly economical to manufacture. The basket can be stored in a minimum of space and is convenient to use as fish may be easily secured within the basket. Further the instant invention is of a design eliminating metal plates so that it is highly serviceable and resistive to salt and fresh water environments.

It will be obvious to those skilled in the art to make various changes and alterations to the invention described herein. It is intended that to the extent that these changes and alterations do not depart from the spirit and scope of the appended claim they are intended to be encompassed therein.

I claim:

1. A buoyant corrosion resistant fish basket including:
    a. a flotation collar member formed of foamed buoyant plastic and selected to provide buoyancy for the entire basket when placed in water;
    b. a flexible non-metallic mesh bag, the open end thereof secured to said flotation collar by wrapping the open end around said collar and stitching the edge of the open end to said bag;
    c. a buoyant closure member formed of non-metallic material shaped and adapted to close the neck of said bag by engaging the underside of said flotation collar when said basket is placed in water; and
    d. a hinge forming non-metallic rope member, the inner end of which extends through an aperture in said flotation collar and which also passes through at least one aperture formed in said closure member near the periphery thereof to function as a hinge for the closure member and to exert a closing force on the closure.

* * * * *